UNITED STATES PATENT OFFICE.

ISAAC M. MILBANK, OF GREENFIELD HILL, CONNECTICUT.

IMPROVEMENT IN EXPLOSIVE COMPOUNDS.

Specification forming part of Letters Patent No. 157,856, dated December 15, 1874; application filed June 24, 1874.

*To all whom it may concern:*

Be it known that I, ISAAC M. MILBANK, of Greenfield Hill, Connecticut, have invented a new and useful Fulminate Compound, of which the following is a full, clear, and exact description:

My invention has reference more particularly to fulminate used in caps, primers, and cartridges; and it consists in the combination of the several ingredients hereinafter named, and in the proportions set forth.

That others skilled in the art may make and use my invention, I will proceed to state the exact manner in which I have carried it out.

In the preparation of my improved fulminate I use the following ingredients, viz: Chlorate of potash, eighty parts; charcoal, thirty-five parts; red phosphorus, four and one-third parts. These proportions I have found by long experimental tests to be reliable and safe, making a fulminate for primers and cartridges perfectly practicable and certain, although the proportions may be somewhat varied for some uses without detracting from its efficiency or safety.

In mixing these ingredients I prefer to mix separately the phosphorus with any powdered glass or quartz to be used. In special cases the glass may be omitted without detriment.

In caps to be fired on the nipple of a gun, glass or its equivalent is objectionable from its tendency to choke up the fine vent through which its flame must pass. After wetting up the chlorate of potash and charcoal with water I stir in the other mixture—phosphorus and glass—and intimately mix all the parts together.

A greater proportion of pulverized glass, or its equivalent, may be employed in this compound than in the ordinary fulminate of mercury, for the reason that the former, when exploded, develops more flame and heat than the latter.

All the ingredients used should be as finely pulverized as possible previous to being combined together, except the glass, which should present more or less grittiness, according to the requirements of the fulminate. The red or amorphous phosphorus of commerce is generally found in grains more or less fine; but when manipulated with ground glass it is readily reduced to a fine state, adhering to and coating over the particles of glass.

In using said fulminate for primers or cartridges, it is much safer to work it in a wet or moist condition, in which manner fulminates of all kinds are mostly used. If it should become dry it may be softened again any number of times with water without injury.

It is preferable, when first combining the parts, to employ a portion of gum-arabic or starch, either dissolved or in a fine powder, to give more adhesion or tenacity to the mass, which might be necessary in some cases.

Having thus described my invention, what I claim as new, and desire to secure by Letters Patent, is—

A fulminating compound composed of the ingredients, chlorate of potash, charcoal, and red phosphorus, and substantially in the proportions set forth.

ISAAC M. MILBANK.

Witnesses:
LEONARD M. LANDSBEROUGH.
EFFM. H. NICHOLS.